Aug. 25, 1936.  E. A. JOHNSTON ET AL  2,052,303
DRAFT COUPLING DEVICE FOR TRACTORS
Filed Aug. 8, 1934   2 Sheets-Sheet 1
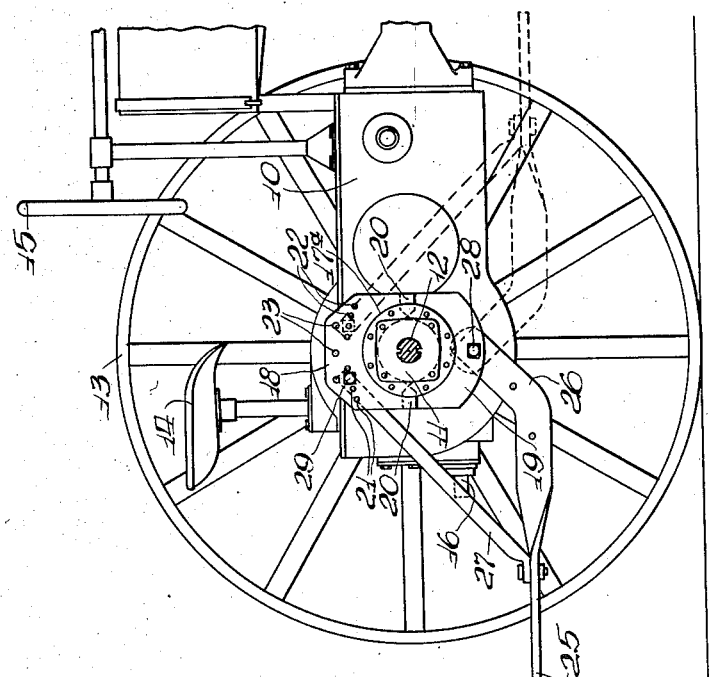
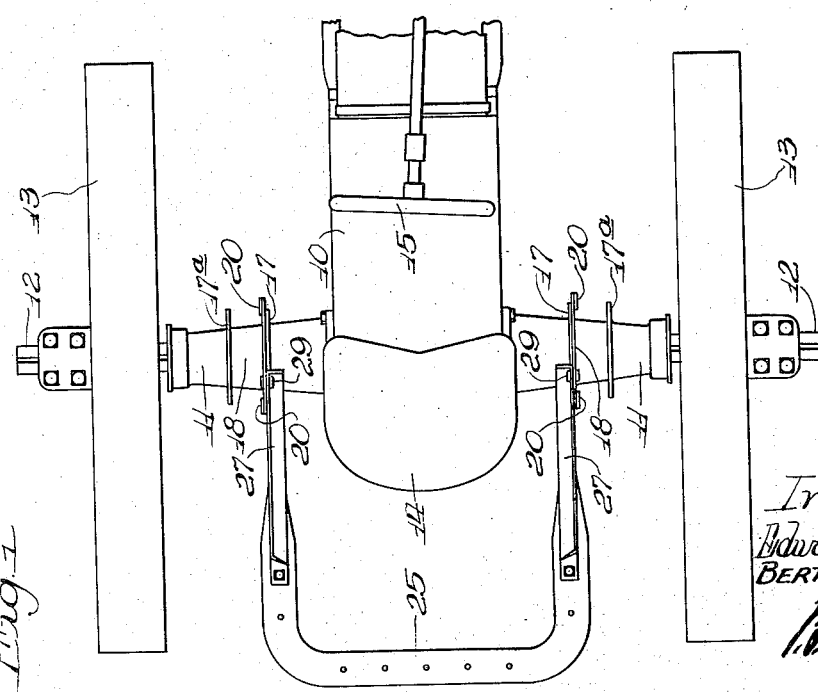
Inventor
Edward A. Johnston
Bert R. Benjamin
Atty.

Aug. 25, 1936.  E. A. JOHNSTON ET AL  2,052,303
DRAFT COUPLING DEVICE FOR TRACTORS
Filed Aug. 8, 1934  2 Sheets-Sheet 2
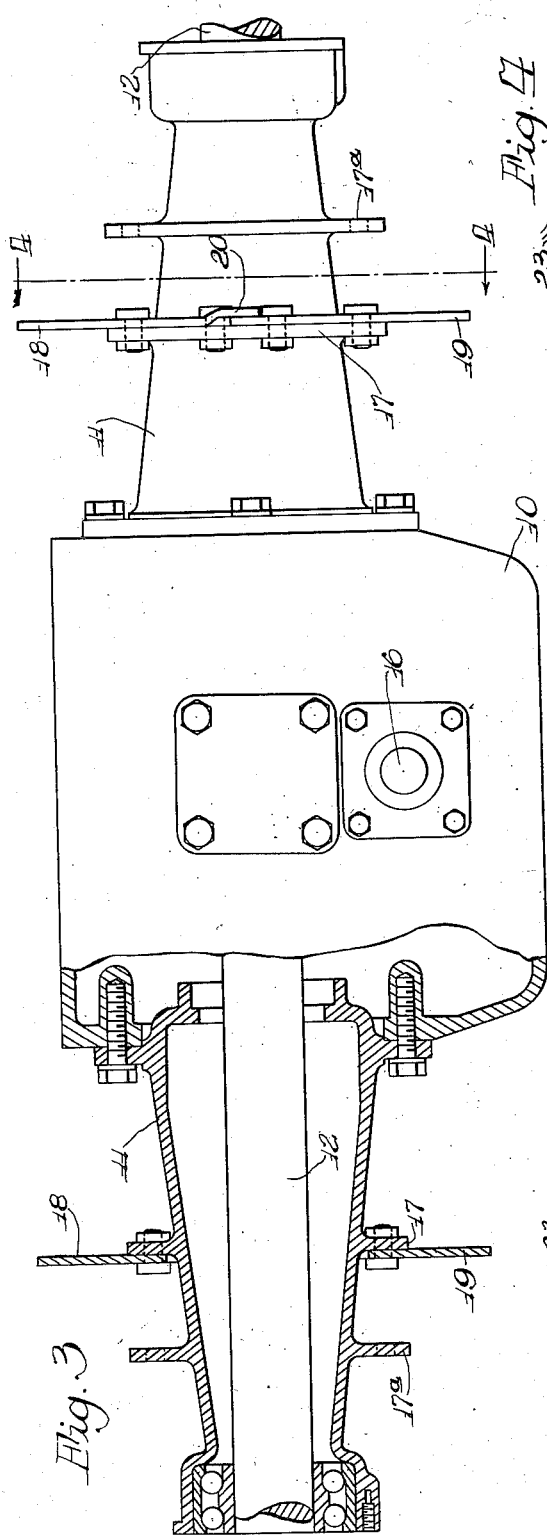
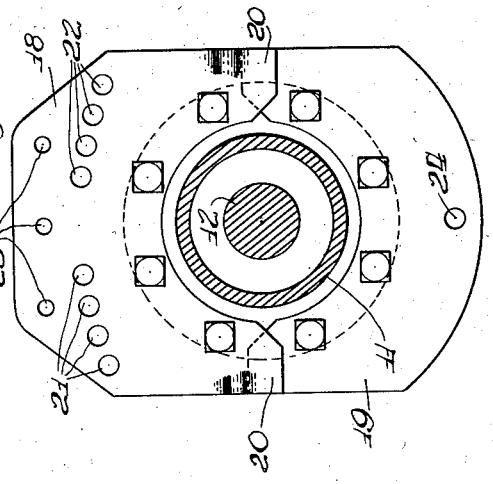
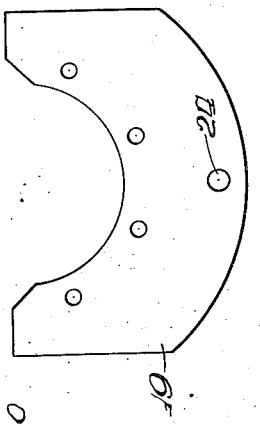
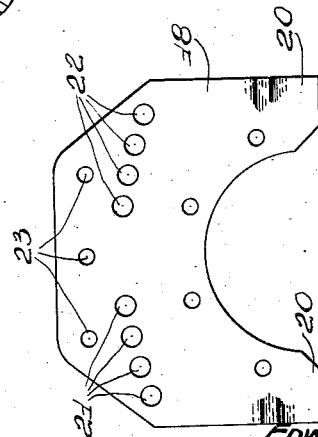
Inventor
EDWARD A. JOHNSTON
BERT R. BENJAMIN Patented Aug. 25, 1936

2,052,303

UNITED STATES PATENT OFFICE 2,052,303

DRAFT COUPLING DEVICE FOR TRACTORS

Edward A. Johnston, Chicago, and Bert R. Benjamin, Oak Park, Ill., assignors to International Harvester Company, a corporation of New Jersey Application August 8, 1934, Serial No. 739,006

12 Claims. (Cl. 280—33.44)

This invention relates to farm tractors and more particularly to features of construction which facilitate the connection and disconnection of draft elements or supporting frames for the various implements that may be mounted on or coupled to the tractor, as was disclosed in the sole application of Edward A. Johnston, Serial No. 658,121, filed February 23, 1933.

The main object of the invention is to provide convenient and readily accessible coupling structure on a tractor axle housing for connection with the draft members or frame pieces of various implements in a quick and simple manner, as particularly desirable with farm tractors of the general purpose type.

Another object is to so form the coupling structure as to make it of practically universal adaptability, thus permitting the draft frame members of implements to be bolted or otherwise secured thereto at various positions or angles as required by the character or structure of the implement.

Other objects and advantages will appear in the following description of a preferred embodiment of the invention, as illustrated in the accompanying drawings, where:

Figure 1 is a plan view of the rear portion of a tractor having a novel draft coupling structure on the axle housings;

Figure 2 is a side view of Figure 1 with the end of the axle in section;

Figure 3 is an enlarged detail view of the axle housings and central body casting of the tractor viewed from behind, one axle housing being shown in section;

Figure 4 is a detail sectional view on line 4—4 of Figure 3; and,

Figures 5 and 6 are detail views of the two parts or sections of the draft coupling members or plates seen in Figure 4.

In the construction illustrated, the tractor has an oblong casing 10 forming the rear end of the tractor body and containing the transmission and differential mechanism. The rear position of this casing has bolted, or otherwise secured to it, on each side the aligned tubular axle housings 11 containing the bearings for the axle shafts 12 which extend beyond the ends of the housings. Traction wheels 13 are adjustably secured to the axle ends. The casing 10 supports the centrally located driver's seat 14 in convenient relation to the usual steering wheel 15 and other controls not shown. The casing 10 has suitable bearings in its lower position for the central power take-off shaft 16 which projects from the rear wall thereof and is driven through suitable gearing within the casing.

In the present invention the opposite axle housings 11 are formed with integral flanges 17 extending radially from the housings. There may be a second flange 17a on each housing spaced from the flange 17 if desired, in order to provide for the attachment of wider draft frames or for attachment in different positions laterally, but the invention will be explained in connection with one such flange as it is immaterial on which of the flanges the cooperating parts to be described are mounted.

The flanges 17 are preferably formed with suitably spaced bolt holes in the circumference thereof to provide means of attachment for coupling members or plates 18 and 19. These plates are formed with arcuate inner edges as shown in Figures 5 and 6 to fit on the axle housings and against the flange 17 to which they are bolted, as shown, or otherwise secured. When in position, upper plate 18 and lower plate 19 completely encircle the axle housing and the ends of the arms or fork of the upper plate are preferably offset, as at 20, sufficiently to overlap the upper ends of the lower plate, thereby strengthening the coupling structure as a whole. Both plates are provided with means for the reception of fastening elements of draft frames, and these preferably consist of bolt openings symmetrically disposed in the peripheral portions of the plates so as to provide for various connections at selected positions or adjustments. In the present instance the upper plate 18 is shown with two arcuately arranged series of openings 21 and 22, some forward of and others back of the housing. Additional openings 23 may be provided to meet the various requirements of position and adjustment met with in coupling up various implement draft frames with the coupling plates. With the exception of the lower edges, the coupling plates are formed with straight, angularly related peripheral edges, as best seen in Fig. 4, which edges of the plates on the respective flanges lie in common planes. The edges so presented are adapted to register with the correspondingly straight draft or frame bars likely to be at varying angles on the different implements which may be provided for direct connection, interchangeably, to the coupling plates.

In the present instance the lower plate 19 is shown with a bolt opening 24 directly below the axis of the axle housing and central with respect to the series of openings 21 and 22. This opening is therefore positioned to cooperate with the serial openings 21, 22 in the upper plate in the mounting on the coupling plates of a U-shaped draft frame or member 25. This draft frame is designed to either support or serve as a draft connection for implements of different types. It consists of a substantially horizontal portion having arms inclined upwardly, as at 26, and formed with openings in their ends which register with the openings 24 in the lower plates 19. Each arm of the horizontal U-shaped member has an upwardly inclined strut member 27 secured to it, the upper end of which is formed with an opening adapted to register with a selected opening in either series of openings 21 or 22 in the upper plate, depending on the desired position of the draft frame. With this arrangement of parts, the draft frame may be positioned as illustrated in full lines on Figure 2, and suitable bolts 28 and 29 passed through the registering openings to secure the draft frame in position. Or, the draft frame may be reversed, as shown in dotted lines, and similarly secured. The additional openings provide for angular adjustment of the horizontal portion of the frame about the bolts 28 in the openings 24.

As will be obvious to those skilled in the art, other arrangements of or additional openings can be provided in the coupling plates where needed or desired, or other forms of draft frames used, and a wide range of utility is therefore obtainable to meet any requirement arising in connection with the various implements and parts that may be mounted on the tractor. The above disclosure illustrates one form of the invention which may, however, be embodied in other forms within the scope of the appended claims.

What is claimed is:

1. The combination with the opposite axle housings of a tractor, of means for coupling implement draft members thereto in various positions laterally comprising radially extending members surrounding the axle housings and formed with means in opposite peripheral portions thereof for the reception of coupling elements.

2. The combination with the opposite axle housings of a tractor, of means for coupling implement draft members thereto in various positions laterally comprising radially extending members surrounding the axle housings and having bolt openings therein located above and below the housings.

3. The combination with the opposite axle housings of a tractor, of means for coupling implement draft members thereto in various positions laterally comprising radially extending members surrounding the axle housings and having bolt openings therein located above and below the housings, certain of said openings being forward and others back of the housings.

4. The combination with the opposite axle housings of a tractor, of radially extending coupling members surrounding the axle housings and formed with means on opposite sides of the housings for the reception of coupling elements, and an implement draft frame having members selectively engageable with said means at either side of the housings for changing the position of said frame.

5. The combination with the opposite axle housings of a tractor, of radially extending coupling members surrounding the axle housings and having bolt openings therein located above and below the housings, certain of the openings above the housings being symmetrically disposed forward and back of the housings, and an implement draft frame having members selectively engageable with the openings above the housings thereby permitting reversal of the implement frame.

6. The combination with the opposite axle housings of a tractor, of radially extending coupling members surrounding the axle housings and having bolt openings therein located above and below the housings, certain of the openings above the housings being symmetrically disposed forward and back of the housings, an implement draft frame having a substantially horizontal U-shaped portion, the arms of which are connected to the lower portions of the opposite coupling members, and inclined strut bars secured to said arms and bolted at their upper ends to said coupling members at selected points above the housings.

7. The combination with the opposite axle housings of a tractor, of radial flanges formed thereon, and implement coupling means mounted on said flanges comprising radially extending plates secured to said flanges on opposite sides of the housings and formed with openings for the reception of frame coupling elements.

8. The combination with the opposite axle housings of a tractor, of radial flanges formed thereon, and implement coupling means mounted on said flanges, comprising radially extending plates surrounding the housings and secured to said flanges, said plates being formed with symmetrically disposed openings located on opposite sides of the housings for the reception of frame coupling elements.

9. The combination with a tractor having a rear axle housing with flange portions laterally spaced thereon and integral with said axle housing, of implement draft members, coupling means connected to said flange portions for connecting the implement draft members thereto, said coupling means comprising upper and lower plate members, and means for securing said upper and lower plate members to said flange portions.

10. The combination with a tractor having a rear axle housing with flange portions laterally spaced thereon and integral with said axle housing, of implement draft members, coupling means connected to said flange portions for connecting the implement draft members thereto, means for securing said coupling means to said flange portions, and means co-axially spaced in said coupling means for securing said implement draft members thereto.

11. The combination with a tractor having transversely aligned axle housings, of radial flanges thereon formed with circumferentially spaced bolt openings, and coupling members having arcuate attaching portions formed with similar openings and partially surrounding the axle housings and bolted to the radial flanges, the peripheral portions of said coupling members being formed with apertures adapted for the reception of draft frame connecting elements.

12. The combination with a tractor having transversely aligned axle housings, of radial flanges thereon, coupling members adapted for connecting implement draft members to said flanges, and means for attaching the coupling members to the flanges with the coupling members lying in vertical planes parallel to each other and to the flanges, each coupling member having certain of its peripheral edges straight, the straight edges of the coupling members on the respective flanges lying in a common plane perpendicular to the vertical planes of the flanges.

EDWARD A. JOHNSTON.
BERT R. BENJAMIN.